United States Patent
Tamane et al.

(10) Patent No.: US 10,737,550 B2
(45) Date of Patent: Aug. 11, 2020

(54) REMOTE AIR CONDITIONING START SYSTEM, CENTER SERVER AND METHOD FOR CONTROLLING REMOTE AIR CONDITIONING START SYSTEM

(71) Applicant: TOYOTA JIDOSHA KABUSHIKI KAISHA, Toyota-shi (JP)

(72) Inventors: Yasuyuki Tamane, Miyoshi (JP); Masato Endo, Nagakute (JP); Kenichi Murata, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 171 days.

(21) Appl. No.: 15/881,068

(22) Filed: Jan. 26, 2018

(65) Prior Publication Data

US 2018/0222283 A1    Aug. 9, 2018

(30) Foreign Application Priority Data

Feb. 3, 2017    (JP) .................................. 2017-019131

(51) Int. Cl.
*B60H 1/00*    (2006.01)
*H04W 4/02*    (2018.01)
(Continued)

(52) U.S. Cl.
CPC ..... *B60H 1/00657* (2013.01); *B60H 1/00742* (2013.01); *B60H 1/00771* (2013.01);
(Continued)

(58) Field of Classification Search
CPC ............ B60H 1/00657; B60H 1/00771; B60H 1/00742; H04L 67/18; H04L 67/025
See application file for complete search history.

(56) References Cited

U.S. PATENT DOCUMENTS

2003/0127527 A1* 7/2003 Ichishi ............... B60H 1/00735
                                                                 236/49.3
2003/0193390 A1    10/2003 Muramatsu
(Continued)

FOREIGN PATENT DOCUMENTS

DE    10 2010 006 149 A1    8/2011
JP          11-62793           3/1999
(Continued)

OTHER PUBLICATIONS

BMW USA, BMW Display Key | BMW Genius How-To, Sep. 16, 2015, Youtube "https://www.youtube.com/watch?v=7GACdSSA3KE" (Year: 2015).*

*Primary Examiner* — Rami Khatib
*Assistant Examiner* — Wilton E Liano
(74) *Attorney, Agent, or Firm* — Oblon, McClelland, Maier & Neustadt, L.L.P.

(57) ABSTRACT

A remote air conditioning start system includes a portable terminal of a user, a center server configured to communicate with the portable terminal, and a vehicle that includes an air conditioner and is configured to communicate with the center server. The remote air conditioning start system includes a user positional information acquisition unit, a vehicle positional information acquisition unit, and a controller. The user positional information acquisition unit is configured to acquire positional information of the portable terminal. The vehicle positional information acquisition unit is configured to acquire positional information of the vehicle. The controller is configured to perform control of the air conditioner including a start timing of the air conditioner based on a start request transmitted from the portable terminal to the center server according to a predetermined operation of the user based on the positional information of the portable terminal and the positional information of the vehicle.

8 Claims, 4 Drawing Sheets

(51) Int. Cl.
*H04L 29/08* (2006.01)
*H04W 4/44* (2018.01)
*H04W 4/50* (2018.01)
*G05B 15/02* (2006.01)

(52) U.S. Cl.
CPC ......... *B60H 1/00971* (2013.01); *G05B 15/02* (2013.01); *H04W 4/023* (2013.01); *H04L 67/12* (2013.01); *H04W 4/44* (2018.02); *H04W 4/50* (2018.02)

(56) References Cited

U.S. PATENT DOCUMENTS

| | | | |
|---|---|---|---|
| 2008/0073057 A1* | 3/2008 | Kojima | B60H 1/00735 165/43 |
| 2009/0195370 A1 | 8/2009 | Huffman et al. | |
| 2010/0023210 A1* | 1/2010 | Flick | B60H 1/004 701/36 |
| 2012/0282913 A1 | 11/2012 | Kaindl et al. | |
| 2013/0079978 A1* | 3/2013 | Uyeki | B60H 1/00657 701/36 |
| 2013/0151037 A1* | 6/2013 | Harumoto | B60H 1/00657 701/2 |
| 2013/0151038 A1 | 6/2013 | Harumoto et al. | |
| 2014/0074320 A1 | 3/2014 | Nishida | |
| 2014/0081481 A1* | 3/2014 | Nishida | B60H 1/00771 701/2 |
| 2016/0101745 A1* | 4/2016 | Siswick | H04L 67/125 701/2 |
| 2016/0114649 A1* | 4/2016 | Geissenhoener | B60H 1/00657 701/36 |

FOREIGN PATENT DOCUMENTS

| | | |
|---|---|---|
| JP | 2009-280063 A | 12/2009 |
| JP | 2012-201220 A | 10/2012 |
| JP | 2013-121736 A | 6/2013 |
| JP | 2013-238184 | 11/2013 |
| WO | WO 2013/124990 A1 | 8/2013 |

* cited by examiner

REMOTE AIR CONDITIONING START SYSTEM, CENTER SERVER AND METHOD FOR CONTROLLING REMOTE AIR CONDITIONING START SYSTEM

INCORPORATION BY REFERENCE

The disclosure of Japanese Patent Application No. 2017-019131 filed on Feb. 3, 2017 including the specification, drawings and abstract is incorporated herein by reference in its entirety.

BACKGROUND

1. Technical Field

The present disclosure relates to a remote air conditioning start system, a center server and method for controlling a remote air conditioning start system.

2. Description of Related Art

In a system in which a user performs a remote start of an engine and an air conditioner from a distant place from a vehicle using a remote control, a technique in which an in-vehicle device performs control (restriction) of an idling duration of the engine, or the like based on positional information (current position) of the vehicle is known (for example, see Japanese Unexamined Patent Application Publication No. 11-62793 (JP 11-62793 A) or the like).

SUMMARY

However, in JP 11-62793 A, since a position of the user is not taken into consideration, there is a possibility that a problem occurs. For example, in a case where an operation time of the air conditioner is set, when the same operation time as in a case of using at home is set even though the distance between the user and the vehicle is relatively large, the air conditioner is stopped long before the user arrives at the vehicle, and there is a possibility that the inside of a cabin of the vehicle is returning to a cooled state (winter) or a warmed state (summer) before the user arrives at the vehicle.

The disclosure provides a remote air conditioning start system, a center server and method for controlling a remote air conditioning start system capable of, when a user starts an air conditioner of a vehicle at a position distant from the vehicle, operating the air conditioner in consideration of positional information of the user.

A first aspect of the disclosure relates to a remote air conditioning start system including a portable terminal of a user, a center server that is configured to communicate with the portable terminal, and a vehicle that includes an air conditioner and is configured to communicate with the center server. The remote air conditioning start system includes a user positional information acquisition unit, a vehicle positional information acquisition unit, and a controller. The user positional information acquisition unit is configured to acquire positional information of the portable terminal. The vehicle positional information acquisition unit is configured to acquire positional information of the vehicle. The controller is configured to perform control of the air conditioner including a start timing of the air conditioner based on a start request transmitted from the portable terminal to the center server according to a predetermined operation of the user based on the positional information of the portable terminal and the positional information of the vehicle.

According to the first aspect of the disclosure, the air conditioner of the vehicle is started according to the start request transmitted from the portable terminal to the center server. Then, the controller performs the control of the air conditioner including the start timing based on the positional information of the portable terminal and the positional information of the vehicle. Accordingly, since it is possible to ascertain the position of the user from the positional information of the portable terminal, it is possible to operate the air conditioner in consideration of the position of the user.

In the remote air conditioning start system according to the first aspect of the disclosure, the controller may be configured to start the air conditioner based on the start request. The controller may be configured to stop the air conditioner when a set time has elapsed after the start. The controller may be configured to make the set time longer or the start timing of the air conditioner later when a distance between the vehicle and the portable terminal based on the positional information of the vehicle and the positional information of the portable terminal becomes longer.

According to the first aspect of the disclosure, when the set time has elapsed from the starting point (for example, the start itself may be set as a starting point or a time when another condition is satisfied after the start may be set as a starting point) after the start of the air conditioner, the air conditioner is stopped. The longer the distance between the vehicle and the portable terminal, the longer the set time or the later the start timing of the air conditioner. Accordingly, for example, it is possible to suppress a situation in which the air conditioner is stopped long before the user arrives at the vehicle, and the inside of a cabin of the vehicle is returned to a cooled state (winter) or a warmed state (summer) before the user arrives at the vehicle.

In the remote air conditioning start system according to the first aspect of the disclosure, the controller may be configured to, when a user's behavior of stopping or a behavior of moving away from the vehicle is confirmed based on the positional information of the portable terminal after the start request is transmitted from the portable terminal, make the set time longer or the start timing of the air conditioner later.

According to the first aspect of the disclosure, even though the timing at which the user arrives at the vehicle is made late due to the user's behavior of stopping or moving away from the vehicle, it is possible to suppress a situation in which the inside of a cabin of the vehicle is returned to a cooled state (winter) or a warmed state (summer) before the user arrives at the vehicle.

In the remote air conditioning start system according to the first aspect of the disclosure, the controller may be configured to, when a distance between the vehicle and the portable terminal based on the positional information of the portable terminal and the positional information of the vehicle exceeds a predetermined threshold, restrict the start of the air conditioner.

According to the first aspect of the disclosure, for example, in a situation in which the distance between the vehicle and the user is too large and the operation time of the air conditioner becomes extremely too long, the start of the air conditioner is restricted. For this reason, it is possible to suppress a situation in which the operation time of the air conditioner becomes extremely long and energy is wastefully consumed.

In the remote air conditioning start system according to the first aspect of the disclosure, the controller may be configured to, when the distance between the vehicle and the portable terminal exceeds the predetermined threshold, prohibit the start of the air conditioner.

In the remote air conditioning start system according to the first aspect of the disclosure, the controller may be configured to, when the distance between the vehicle and the portable terminal exceeds the predetermined threshold, start the air conditioner after restricting an air volume.

In the remote air conditioning start system according to the first aspect of the disclosure, the controller may be configured to control the air conditioner according to learning data relating to a past behavior pattern of the user ascertained based on the positional information of the portable terminal until the user arrives at the vehicle from an input of the predetermined operation.

According to the first aspect of the disclosure, since the past behavior pattern of the user can be taken into consideration in addition to the positional information of the user, for example, it is possible to realize air conditioning control adjusted to the user, such as taking a time until the user arrives at the vehicle into consideration and controlling the air conditioner such that a set temperature is reached at an arrival time.

The remote air conditioning start system according to the first aspect of the disclosure may further include a notification unit provided in the portable terminal. The notification unit may be configured to, when the controller controls the air conditioner based on the positional information of the portable terminal and the positional information of the vehicle, notify the user that the air conditioner is controlled.

According to the first aspect of the disclosure, when the air conditioner is controlled in consideration of the positional information of the user, the user is notified that the air conditioner is controlled. For this reason, for example, when the control specification is changed from a content (for example, the operation time of the air conditioner, or the like) set by the user, it is possible to suppress a situation in which the user feels a sense of discomfort.

A second aspect of the disclosure relates to a remote air conditioning start system including a portable terminal of a user, a center server that is configured to communicate with the portable terminal, and a vehicle that includes an air conditioner and is configured to communicate with the center server, the remote air conditioning start system being configured to start the air conditioner according to a start request transmitted from the portable terminal to the center server based on a predetermined operation of the user. The remote air conditioning start system includes a user positional information acquisition unit, a vehicle positional information acquisition unit, and a notification unit. The user positional information acquisition unit is configured to acquire positional information of the portable terminal. The vehicle positional information acquisition unit is configured to acquire positional information of the vehicle. The notification unit is provided in the portable terminal and configured to give notification of recommendation information relating to a control specification including a start timing of the air conditioner settable from the portable terminal or restriction information for recommending a start restriction of the air conditioner based on the positional information of the portable terminal and the positional information of the vehicle.

According to the second aspect of the disclosure, the air conditioner of the vehicle is started according to the start request transmitted from the portable terminal to the center server. Then, in the portable terminal, the user is notified of the recommendation information relating to the control specification of the air conditioner settable from the portable terminal or the restriction information for recommending the start restriction of the air conditioner based on the positional information of the portable terminal and the positional information of the vehicle. Accordingly, the user is notified of the recommendation information relating to the control specification of the air conditioner or the restriction information for recommending the start restriction based on the positional information of the portable terminal, whereby it is possible to allow the user to perform an operation corresponding to the recommendation information or the restriction information on the portable terminal and to change various settings of the air conditioner or cancel the start of the air conditioner. For this reason, it is possible to operate the air conditioner in consideration of the position of the user.

The remote air conditioning start system according to the second aspect of the disclosure may further include a controller configured to start the air conditioner based on the start request, and when a set time has elapsed after the start, stop the air conditioner. The notification unit may be configured to give notification of the recommendation information for making the set time longer or the start timing later when a distance between the vehicle and the portable terminal based on the positional information of the portable terminal and the positional information of the vehicle becomes longer.

According to the second aspect of the disclosure, when the set time has elapsed from a starting point (for example, the start itself may be set as a starting point or a time when another condition is satisfied after the start may be set as a starting point) after the start of the air conditioner, the air conditioner is stopped. Then, in the portable terminal, the recommendation information for making the set time longer or the starting timing of the air conditioner later when the distance between the vehicle and the portable terminal becomes longer is notified. Accordingly, the user performs an operation corresponding to the recommendation information on the portable terminal, whereby, for example, it is possible to suppress a situation in which the air conditioner is stopped long before the user arrives at the vehicle, and the inside of a cabin of the vehicle is returned to a cooled state (winter) or a warmed state (summer) before the user arrives at the vehicle.

In the remote air conditioning start system according to the second aspect of the disclosure, the notification unit may be configured to, when the distance between the vehicle and the portable terminal based on the positional information of the portable terminal and the positional information of the vehicle exceeds a predetermined threshold, give notification of the restriction information for recommending the start restriction of the air conditioner.

According to the second aspect of the disclosure, for example, in a situation in which the distance between the vehicle and the user is too large and the operation time of the air conditioner becomes extremely too long, the restriction information is notified. For this reason, the user performs an operation corresponding to the restriction information on the portable terminal and cancels the start of the air conditioner, or the like, whereby it is possible to suppress a situation in which the operation time of the air conditioner becomes extremely long and energy is wastefully consumed.

A third aspect of the disclosure relates to a center server that is connected to be configured to communicate with a portable terminal of a user and a vehicle including an air conditioner, receives a start request of the air conditioner transmitted from the portable terminal according to a predetermined operation of the user, and transmits the start request to the vehicle to start the air conditioner. The center server includes a user positional information acquisition unit, a vehicle positional information acquisition unit, a command unit, and a transmission unit. The user positional information acquisition unit is configured to acquire positional information of the portable terminal. The vehicle positional information acquisition unit is configured to acquire positional information of the vehicle. The command unit is configured to generate a control command for controlling the air conditioner based on the positional information of the portable terminal and the positional information of the vehicle or generate a notification command for giving notification of recommendation information relating to a control specification of the air conditioner settable from the portable terminal or restriction information for recommending a start restriction of the air conditioner based on the positional information of the portable terminal and the positional information of the vehicle. The transmission unit is configured to transmit the control command to the vehicle or transmit the notification command to the portable terminal.

A fourth aspect of the disclosure relates to a method for controlling a remote air conditioning start system including a portable terminal of a user, a center server that is configured to communicate with the portable terminal, and a vehicle that includes an air conditioner and is configured to communicate with the center server. The method includes acquiring positional information of the portable terminal; acquiring positional information of the vehicle; and performing control of the air conditioner including a start timing of the air conditioner based on a start request transmitted from the portable terminal to the center server according to a predetermined operation of the user based on the positional information of the portable terminal and the positional information of the vehicle.

According to the aspects of the disclosure, it is possible to provide a remote air conditioning start system and the like capable of operating the air conditioner in consideration of the positional information of the user when the user starts the air conditioner of the vehicle from a position distant from the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
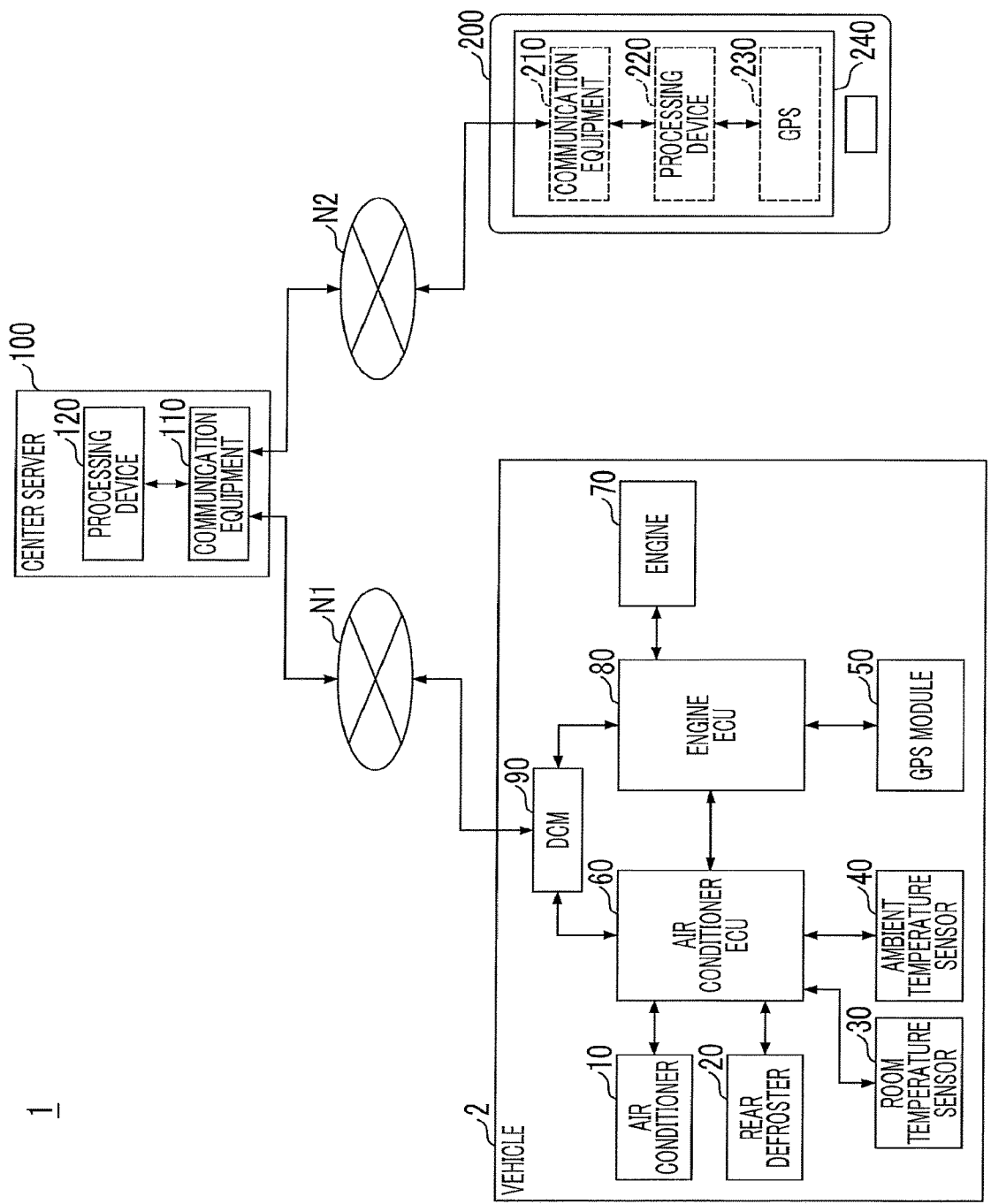
FIG. 1 is a configuration diagram showing an example of the configuration of a remote air conditioning start system.

Hereinafter, a mode for carrying out the disclosure will be described referring to the drawings.

First, the configuration of a remote air conditioning start system 1 according to the embodiment will be described referring to FIGS. 1 to 4.

Figure 2:
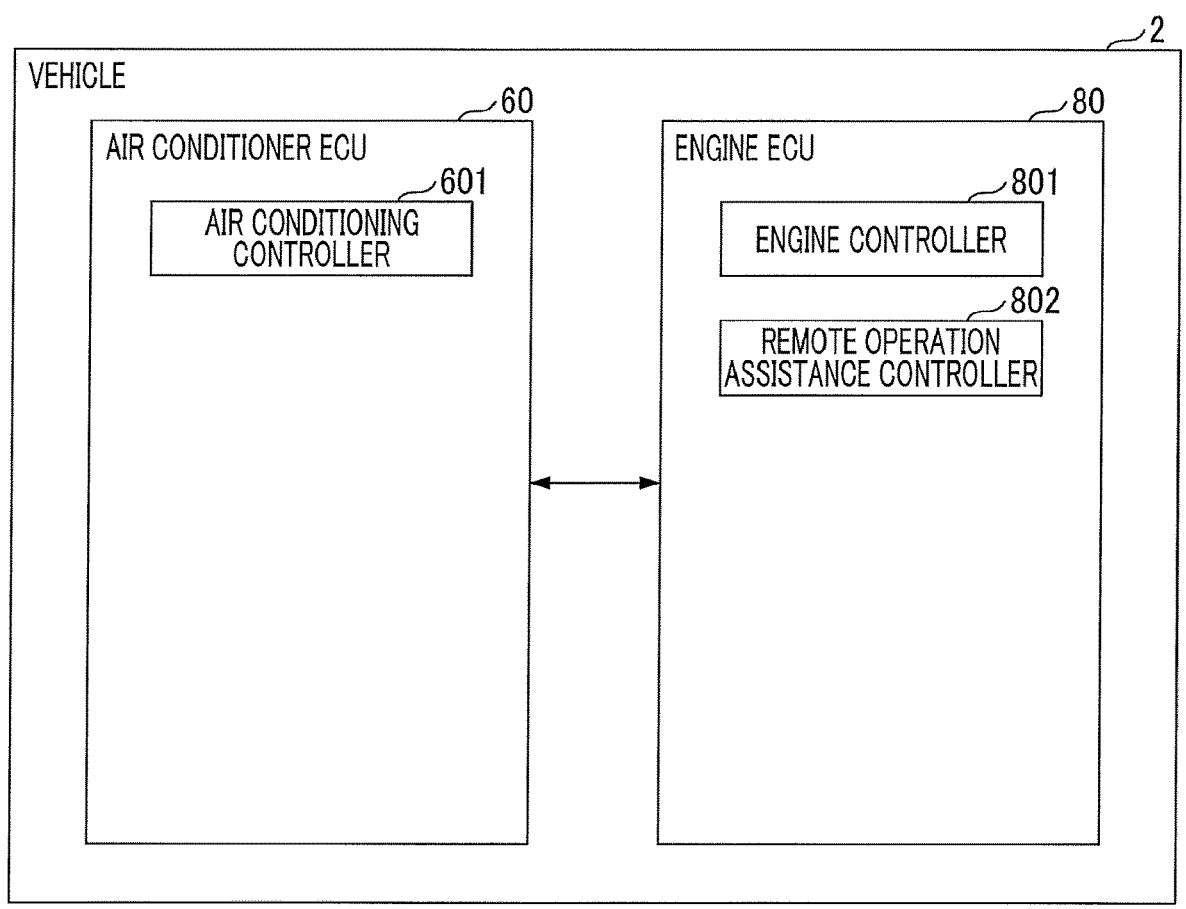
FIG. 2 is a functional block diagram showing an example of the functional configuration of a vehicle (air conditioner ECU and engine ECU) according to a first embodiment.
Figure 3:
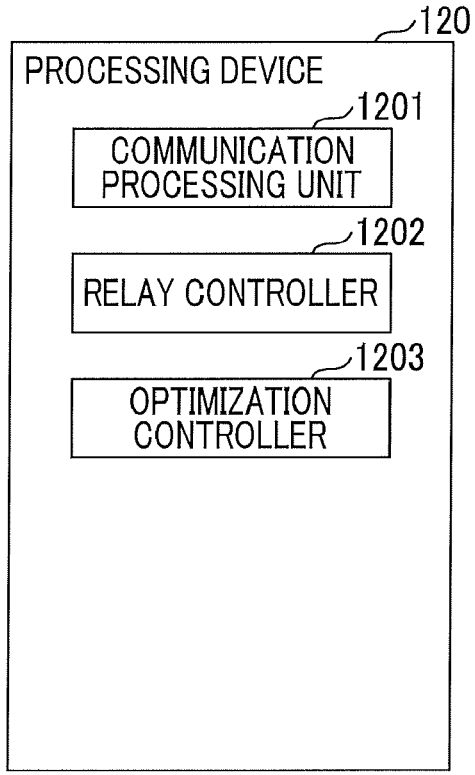
FIG. 3 is a functional block diagram showing an example of the functional configuration of a center server (processing device)
Figure 4:
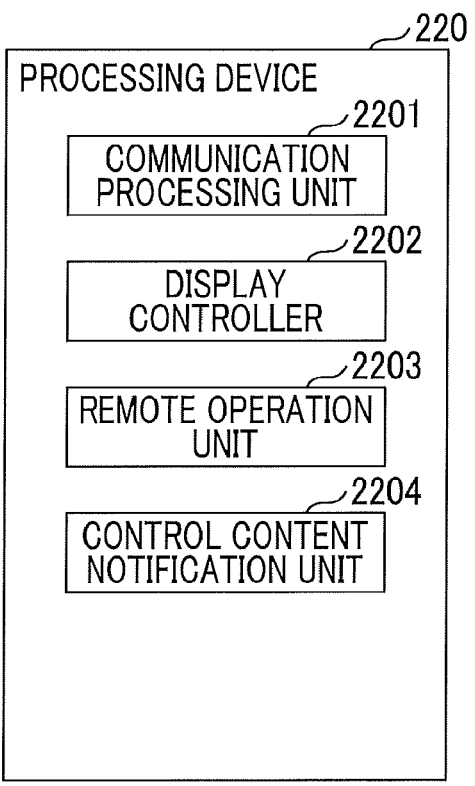
FIG. 4 is a functional block diagram showing an example of the functional configuration of a portable terminal (processing device)

FIG. 1 is a configuration diagram showing an example of the configuration of the remote air conditioning start system 1 according to the embodiment. FIG. 2 is a functional block diagram showing an example of the functional configuration of a vehicle 2 (air conditioner ECU 60 and engine ECU 80). FIG. 3 is a functional block diagram showing an example of the functional configuration of a center server 100 (processing device 120). FIG. 4 is a functional block diagram showing an example of the functional configuration of a portable terminal 200 (processing device 220).

The remote air conditioning start system 1 includes the vehicle 2, the center server 100, and the portable terminal 200 that is carried with a user, and starts an air conditioner 10 described below of the vehicle 2 according to a start request transmitted from the portable terminal 200 to the vehicle 2 through the center server 100.

The vehicle 2 includes the air conditioner 10, a rear defroster 20, a room temperature sensor 30, an ambient temperature sensor 40, a global positioning system (GPS) module 50, an air conditioner electronic control unit (ECU) 60, an engine 70, an engine ECU 80, and a DCM 90.

The air conditioner 10 adjusts an inside temperature or the like of the vehicle 2. The air conditioner 10 includes, for example, a refrigeration cycle including an evaporator (not shown), a compressor (not shown) that is driven by the engine 70, and the like, and a heater (not shown) having a coolant of the engine 70 as a heat source. The air conditioner 10 adjusts the temperature of air sent out from a blowout port by appropriately mixing air (cold air) cooled while passing through the evaporator and air (hot air) warmed with the coolant of the engine 70 as a heat source under the control of the air conditioner ECU 60 (air conditioning controller 601 described below) such that the ratio is changeable. The air conditioner 10 has a defroster mode, and removes frost generated outside or frost generated inside of a cabin of a windshield of the vehicle 2 by sending out air having relatively low humidity and relatively high temperature along the front windshield of the vehicle 2 from a blowout port corresponding to the defroster mode.

The rear defroster 20 removes frost generated outside or frost generated inside the cabin of a rear windshield of the vehicle 2 under the control of the air conditioner ECU 60. The rear defroster 20 includes, for example, an electrically heated wire embedded in the rear windshield.

The room temperature sensor 30 is provided inside the cabin of the vehicle 2, for example, inside an instrument panel (not shown), and detects the temperature (inside temperature) inside the cabin. The room temperature sensor 30 is connected to be configured to communicate with the air conditioner ECU 60 through a one-to-one communication line, and a detection signal corresponding to the detected inside temperature is transmitted to the air conditioner ECU 60.

The ambient temperature sensor 40 is provided outside the cabin of the vehicle 2, for example, in a front end portion (a portion where outside air is introduced) of an engine compartment provided in a front portion of the vehicle 2, that is, on a back side of a front grille of the vehicle 2, and detects the temperature (ambient temperature) outside the cabin of the vehicle 2. The ambient temperature sensor 40 is connected to be configured to communicate with the air conditioner ECU 60 through a one-to-one communication line or the like, and a detection signal corresponding to the detected ambient temperature is transmitted to the air conditioner ECU 60.

The GPS module 50 receives GPS signals transmitted from three or more (preferably, four or more) satellites above the vehicle 2, and measures the position of the vehicle 2 in which the GPS module 50 is mounted. The GPS module 50 is connected to be configured to communicate with the engine ECU 80 and the like through a one-to-one communication line or an in-vehicle network, such as a CAN, and measured positional information of the vehicle 2 is transmitted to the engine ECU 80 and the like.

The air conditioner ECU 60 is an electronic control unit that performs various kinds of control relating to the air conditioner 10 and the rear defroster 20. The air conditioner ECU 60 may be configured such that the functions of the air conditioner ECU 60 are realized by arbitrary hardware, arbitrary software, or a combination of arbitrary hardware and arbitrary software, or may be primarily constituted of, for example, a microcomputer including a CPU, a RAM, a ROM, an I/O, and the like. The air conditioner ECU 60 includes, for example, an air conditioning controller 601 as a functional unit that is realized by executing one or more programs stored in the ROM on the CPU.

The air conditioning controller 601 performs operation control of the air conditioner 10 according to a set state, such as a set temperature and a mode (a plurality of blowout port modes according to combinations of blowout ports or a defroster mode). Specifically, the air conditioning controller 601 performs operation control of the air conditioner 10 based on detection values of the room temperature sensor 30, the ambient temperature sensor 40, and the like, for example, such that the inside temperature becomes the set temperature. The air conditioning controller 601 performs operation control (ON/OFF control) of the rear defroster 20 according to the set state (ON/OFF). The air conditioning controller 601 starts the air conditioner 10 according to an air conditioning start request from a remote operation assistance controller 802 described below, and performs the operation control of the air conditioner 10 according to set contents included in the air conditioning start request. Details of the control contents according to the air conditioning start request from the remote operation assistance controller 802 will be described in detail.

The engine 70 is a drive power source of the vehicle 2. The engine 70 is operated by combusting gasoline, diesel, or the like supplied from a fuel tank (not shown) through a fuel pump in a cylinder under the control of the engine ECU 80. The engine 70, specifically, various actuators (a fuel injection device that injects fuel, an ignition device that ignites gasoline injected into the cylinder, an electric motor that is provided to change an opening and closing timing of an intake or exhaust valve, and the like) incorporated in the engine 70 are connected to be configured to communicate with the engine ECU 80 through a one-to-one communication line or the like, and operate according to a control command transmitted from the engine ECU 80.

The engine ECU 80 is an electronic control unit that performs various kinds of control processing of the engine 70 including a starter (not shown). The engine ECU 80 may be configured such that the functions of the engine ECU 80 are realized by arbitrary hardware, arbitrary software, or a combination of arbitrary hardware and arbitrary software, or may be primarily constituted of, for example, a microcomputer including a CPU, a RAM, a ROM, an I/O, and the like.

The engine ECU 80 includes, for example, engine controller 801 and a remote operation assistance controller 802 as functional units that are realized by executing one or more programs stored in the ROM.

The engine controller 801 performs operation control of the engine 70 according to an operation state (for example, an accelerator operation amount, a selected gear shift stage of a transmission (not shown), and the like) by a driver of the vehicle 2, an environment state (for example, ambient temperature), or the like around the vehicle 2. For example, the engine controller 801 starts the engine 70 in a case where an ignition switch (IG switch) is ON (IG-ON) or the start request is input from the outside. Specifically, the engine controller 801 drives the starter by switching a relay (not shown) bringing the starter into an electric conduction state to a connection state, and the engine 70 is started by appropriately controlling the fuel injection device and the ignition device in conformity with cranking by the starter.

The remote operation assistance controller 802 starts the engine 70 and the air conditioner 10 by transmitting an engine start request and an air conditioning start request to the engine controller 801 and the air conditioning controller 601 according to the start request received from the portable terminal 200 by way of the center server 100, respectively. After the start of the engine 70 and the air conditioner 10, in a case where the set operation time included in the start request or, as described below, a set operation time related to a control specification determined by an optimization controller 1203 has elapsed after the start, the remote operation assistance controller 802 stops the air conditioner 10 and the engine 70. For example, in a case where the set operation time has elapsed after the start of the engine 70 and the air conditioner 10, the remote operation assistance controller 802 may stop the air conditioner 10 and the engine 70, or may stop the air conditioner 10 and the engine 70 when another condition is satisfied (for example, when determination is made that the inside temperature increases to a predetermined reference) after the start of the engine 70 and the air conditioner 10. Details of the processing in the remote operation assistance controller 802 will be described below.

The function of the remote operation assistance controller 802 may be provided in the air conditioner ECU 60 or may be provided in another ECU that is configured to communicate with the air conditioner ECU 60 and the engine ECU 80.

The DCM 90 is a communication device that performs two-way communication with the center server 100 and the portable terminal 200 through a predetermined communication network N1 (for example, a mobile phone network with multiple base stations as terminals, the Internet, or the like). The air conditioner ECU 60, the engine ECU 80, and the DCM 90 are connected to be configured to communicate with one another through an in-vehicle network, such as a CAN.

The center server 100 includes communication equipment 110 and a processing device 120.

The communication equipment 110 is a device that performs two-way communication with the vehicle 2 (DCM 90) and the portable terminal 200 through communication networks N1, N2 under the control of the processing device 120 (communication processing unit 1201).

The processing device 120 performs various kinds of control processing in the center server 100. The processing device 120 is primarily constituted of, for example, one or a plurality of server computers including a CPU, a RANI, a ROM, an I/O, and the like, and includes a communication processing unit 1201, a relay controller 1202, and an optimization controller 1203 as functional units that are realized by executing one or more programs stored in the ROM on the CPU.

The communication processing unit 1201 controls the communication equipment 110, and performs transmission and reception of various signals (control signal, information signal, and the like) with the vehicle 2 and the portable terminal 200.

The relay controller 1202 relays various signals between the vehicle 2 and the portable terminal 200. Details will be described below.

The optimization controller 1203 (an example of a user positional information acquisition unit, a vehicle positional information acquisition unit, a controller, or a command unit) determines a control specification (control content) of the air conditioner 10 based on the positional information of the vehicle 2 and the positional information of the portable terminal 200 acquired from the vehicle 2 and the portable terminal 200 through the communication processing unit 1201. This is because an elapsed time until the user arrives at the vehicle 2 after performing an operation corresponding to the start request on the portable terminal is different according to the positional relationship between the vehicle 2 and the portable terminal 200 (that is, the position of the user who carries the portable terminal 200). For example, the optimization controller 1203 determines the control specification of the air conditioner 10 such that the longer the distance between the vehicle 2 and the portable terminal 200, the longer the operation time (set operation time) of the air conditioner 10. For example, the optimization controller 1203 determines the control specification of the air conditioner 10 such that the longer the distance between the vehicle 2 and the portable terminal 200, the later the timing of starting the air conditioner 10 according to the start request from the portable terminal 200. For example, the optimization controller 1203 determines the control specification of the air conditioner 10 such that, in a case where the distance between the vehicle 2 and the portable terminal 200 is too large (in a case where the distance D between the vehicle 2 and the portable terminal 200 exceeds a predetermined distance Dlim), the start of the air conditioner 10 is restricted (for example, the start is prohibited or the start is performed while an air volume or the like is restricted).

After the communication processing unit 1201 receives the start request from the portable terminal 200, in a case where a user's abnormal behavior (for example, a user's behavior of stopping or moving away from the vehicle) is confirmed based on the positional information of the portable terminal 200, the optimization controller 1203 changes the control specification of the air conditioner 10. For example, in a case where a user's behavior or stopping or moving away from the vehicle is confirmed, the optimization controller 1203 may extend the set operation time of the air conditioner 10. For example, in a case where the user's behavior of stopping or moving away from the vehicle is confirmed, before the start of the air conditioner 10, the optimization controller 1203 may delay the start timing of the air conditioner 10. At this time, in a case where the positional information of the portable terminal 200 is not changed for a predetermined time or more (remains within a predetermined range), the optimization controller 1203 may determine that user performs a behavior of stopping by stopping by a facility halfway. For example, in a case where the positional information of the portable terminal 200 indicates that the user is moving in a direction away from the vehicle 2 for a predetermined time or more, the optimization controller 1203 may determine that the user performs a behavior of moving away from the vehicle 2.

In addition, the optimization controller 1203 may determine the control specification of the air conditioner 10 based on a past behavior pattern of the user, specifically, learning data relating to a past behavior pattern of the user, such as a moving route and a needed time until the user arrives at the vehicle 2 after performing a predetermined operation corresponding to the start request on the portable terminal 200 or the presence or absence of stopping by another place halfway of the route. In the above-described case, the optimization controller 1203 can ascertain the time (date) when the predetermined operation corresponding to the start request is performed on the portable terminal 200 based on the timing, at which the communication processing unit 1201 receives the start request from the portable terminal 200, through the communication processing unit 1201. The optimization controller 1203 can request notification that the user arrives at the vehicle 2 (specifically, notification that the user unlocks and opens a door of the vehicle 2), and can ascertain the time (date) when the user arrives at the vehicle 2 in response to an arrival reply returned from the vehicle 2 according to the request. In a period from when the communication processing unit 1201 receives the start request from the portable terminal 200 until the arrival notification is received from the vehicle 2, the optimization controller 1203 can ascertain the moving route of the user and the presence or absence of stopping by halfway of the route based on time-series data of the positional information of the portable terminal 200 regularly acquired through the communication processing unit 1201. The time when the predetermined operation corresponding to the start request is performed on the portable terminal 200, the time when the user arrives at the vehicle 2, time-series data of the positional information of the portable terminal 200, and the like are accumulated in a storage device (not shown) of the center server 100 in the form of a database. Then, known learning processing is appropriately performed based on data in the database, whereby learning data is generated and stored in the storage device. For example, the optimization controller 1203 predicts the timing (time) at which the user arrives at the vehicle 2 based on the positional information of the vehicle 2, the positional information of the portable terminal 200, and the learning data, and determines the set operation time such that the air conditioner 10 is operated at least until the arrival time, an output (air volume, or the like) of the air conditioner such that a set temperature is reached a little before the arrival time, or the like.

The optimization controller 1203 transmits the generated control specification to the portable terminal 200 (control content notification).

The portable terminal 200 is, for example, a smartphone, a tablet terminal, or the like carried with the user of the vehicle 2. The portable terminal 200 includes communication equipment 210, a processing device 220, a touch panel display (hereinafter, simply referred to as a display) 240.

The communication equipment 210 is a device that performs two-way communication with the center server 100 through a predetermined communication network N2 (for example, a mobile phone network with multiple base stations as terminals, the Internet, or the like) under the control of the processing device 220 (communication processing unit 2201), and is, for example, a long term evolution (LTE) module.

The processing device 220 performs various kinds of control processing in the portable terminal 200. The processing device 220 is primarily constituted of, for example, a computer including a CPU, a RAM, a ROM, an I/O, and the like, and includes communication processing unit 2201, a display controller 2202, a remote operation unit 2203, and a control content notification unit 2204 as functional units that are realized by executing one or more programs stored in the ROM on the CPU.

The communication processing unit 2201 controls the communication equipment 210, and performs transmission and reception of various signals with the center server 100.

The display controller 2202 displays various images on the display 240 according to a predetermined operation of the user. For example, the display controller 2202 displays various graphical user interfaces (GUI) as an operation screen on the display 240.

The remote operation unit 2203 transmits various signals related to a remote operation of the air conditioner 10 including the start request for requesting the start of the engine 70 and the air conditioner 10 to the center server 100 through the communication processing unit 2201 according to a predetermined operation of the user on a predetermined GUI displayed on the display 240 by the display controller 2202. With this, for example, the start request transmitted to the center server 100 is transmitted to the vehicle 2 through the center server 100 (relay controller 1202), and the engine 70 and the air conditioner 10 are started. The user can perform, on the predetermined GUI, various settings in a case of operating the air conditioner 10, and the remote operation unit 2203 transmits various signals, such as the start request including various settings to the center server 100. With this, in the vehicle 2, control of the air conditioner 10 based on set contents (the set temperature as a requested value of the inside temperature by the user, the set operation time as a requested value of the operation time of the air conditioner 10 by the user, and the like) is performed. In a case where an operation (permission operation) to permit the execution of the control specification is performed or when there is a plurality of control specifications, in a case where an operation (selection operation) to select one control specification from among the control specifications is performed on a predetermined GUI that is displayed on the display 240 by the display controller 2202 (control content notification unit 2204) and that includes the control specification of the air conditioner 10 described below, the remote operation unit 2203 transmits permission notification (or selection content notification) to the center server 100 through the communication processing unit 1201. Details of the processing in the remote operation unit 2203 will be described below.

The control content notification unit 2204 (an example of a notification unit) displays, on the display 240, information related to the control specification of the air conditioner 10 included in the control content notification transmitted from the center server 100 based on the control content notification received from the center server 100 by the communication processing unit 2201 through the display controller 2202. Details of the processing in the control content notification unit 2204 will be described below.

A GPS module 230 receives GPS signals transmitted from three or more (preferably, four or more) satellites above the portable terminal 200, and measures the position of the portable terminal 200 in which the GPS module 230 is mounted. Measured positional information of the portable terminal 200 is input to the processing device 220.

The positional information of the portable terminal 200 may be acquired by base station positioning based on exchange of signals with base stations instead of or in addition to GPS positioning with the GPS module 230.

Next, specific operation of the remote air conditioning start system 1 will be described referring to FIG. 5.

Figure 5:
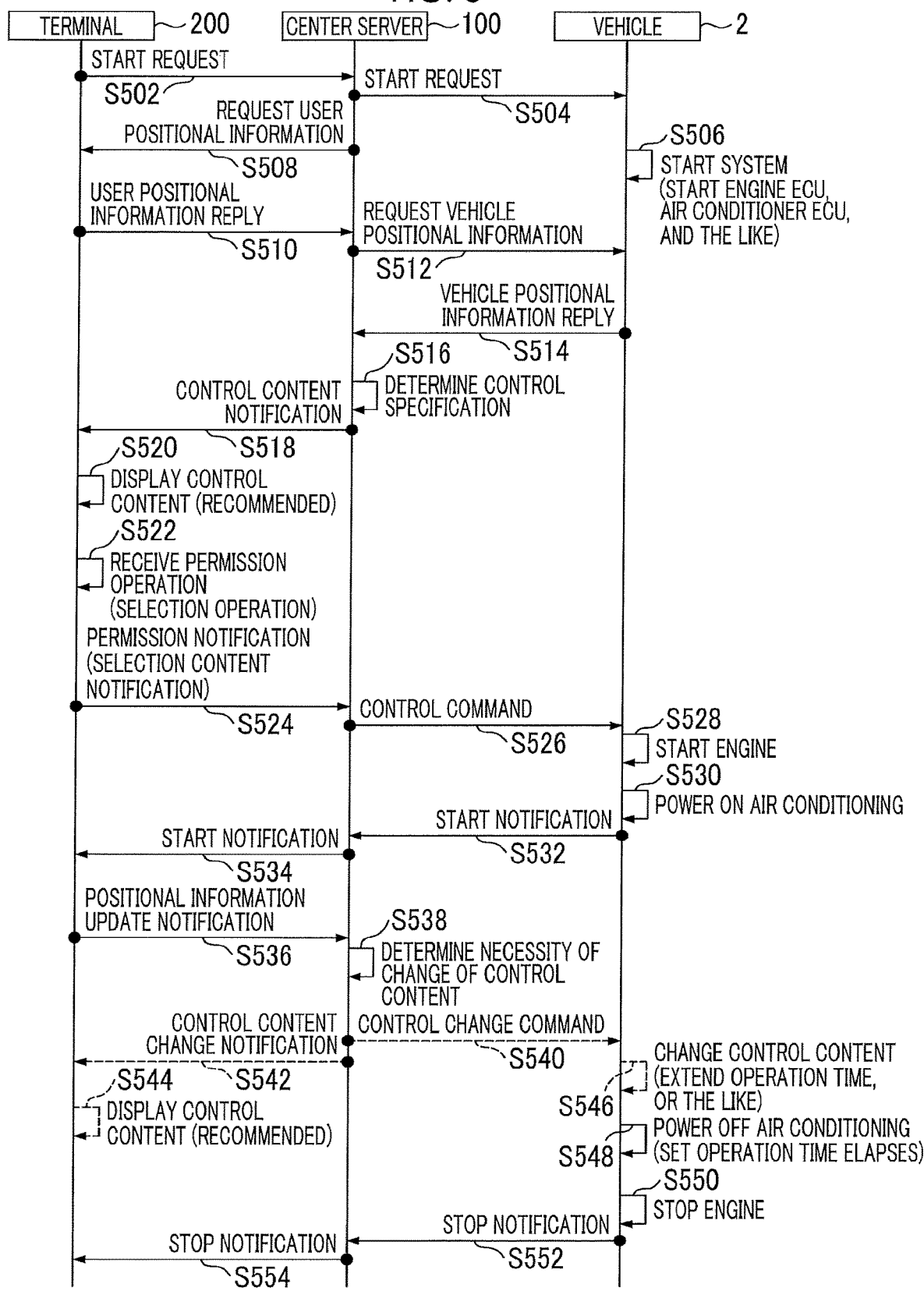
FIG. 5 is a sequence diagram showing an example of operation of a remote air conditioning start system according to the first embodiment.

FIG. 5 is a sequence diagram schematically showing an example of operation of the remote air conditioning start system 1 according to the embodiment.

In Step S502, the remote operation unit 2203 of the portable terminal 200 transmits the start request including various set contents (set temperature, set operation time, and the like) to the center server 100 through the communication processing unit 2201 (an example of a first transmission unit) according to a predetermined operation of the user on a predetermined GUI.

In Step S504, in a case where the start request from the portable terminal 200 is received by the communication processing unit 1201 (an example of a first reception unit), the relay controller 1202 of the center server 100 transfers the start request to the vehicle 2 through the communication processing unit 1201 (an example of a second transmission unit).

In Step S506, a sub-system relating to the remote air conditioning start system 1, such as the air conditioner ECU 60 and the engine ECU 80 of the vehicle 2 is started (powered ON) according to the start request received by the DCM 90.

After the communication processing unit 1201 of the center server 100 transfers the start request (Step S504), in Step S508, the optimization controller 1203 transmits a user positional information request for requesting transmission of the positional information of the portable terminal 200 to the portable terminal 200 through the communication processing unit 1201.

In a case where the user positional information request is received from the center server 100, in Step S510, the communication processing unit of the portable terminal 200 acquires the positional information of the portable terminal 200 input from the GPS module 230 to the processing device 220 from a buffer or the like on the RAM, and transmits the positional information of the portable terminal 200 to the center server 100 (user positional information reply).

In a case where the user positional information reply is received from the portable terminal 200 by the communication processing unit 1201, in Step S512, the optimization controller 1203 of the center server 100 transmits a vehicle positional information request for requesting transmission of the positional information of the vehicle 2 to the vehicle 2 through the communication processing unit 1201.

In a case where the vehicle positional information request is received from the center server 100 by the DCM 90, in Step S514, the remote operation assistance controller 802 of the vehicle 2 acquires the positional information of the vehicle 2 input from the GPS module 50 to the engine ECU 80 from a buffer or the like on the RAM, and transmits the positional information of the vehicle 2 to the center server 100 (vehicle positional information reply).

In a case where the vehicle positional information reply is received from the vehicle 2 by the communication processing unit 1201, in Step S516, the optimization controller 1203 of the center server 100 determines the control specification (control content) based on the positional information of the vehicle 2 and the positional information of the portable terminal 200 received from the vehicle 2 and the portable terminal 200 as described above.

In Step S518, the optimization controller 1203 of the center server 100 transmits the control content notification including the generated control specification to the portable terminal 200 through the communication processing unit 1201.

In Step S520, the control content notification unit 2204 of the portable terminal 200 displays a recommended control specification of the air conditioner 10 included in the control content notification on the display 240 through the display controller 2202 as described above.

In Step S522, the remote operation unit 2203 of the center server 100 receives a permission operation to permit the execution of the displayed control specification or a selection operation to select one control specification from among a plurality of recommended control specifications on a GUI displayed on the display 240 including the display of the control specification of the air conditioner 10.

In Step S524, the remote operation unit 2203 of the center server 100 transmits permission notification or selection content notification through the communication processing unit 2201.

In a case where the permission notification or the selection content notification is received by the communication processing unit 1201, in Step S526, the optimization controller 1203 of the center server 100 transmits a control command including the control specification corresponding to the permission notification or the selection content notification to the vehicle 2.

In a case where the user desires the execution of default control specification or a control specification corresponding to various user's settings included in the start request, and an operation (rejection operation) to reject the execution of a recommended control specification generated by the optimization controller 1203 of the center server 100 is performed on the portable terminal 200, the remote operation unit 2203 of the portable terminal 200 transmits rejection notification through the communication processing unit 2201. Then, in a case where the rejection notification is received by the communication processing unit 1201, the optimization controller 1203 of the center server 100 transmits a control command for commanding control according to the default control specification or the control specification corresponding to various user's settings included in the start request to the vehicle 2 through the communication processing unit 1201. With this, in the vehicle 2, the control of the air conditioner 10 is performed based on the default control specification or a control specification set by the user, instead of a control specification determined by the optimization controller 1203 of the center server 100.

In a case where the control command is received from the center server 100 by the DCM 90, in Step S528, the remote operation assistance controller 802 of the vehicle 2 sends the engine start request to the engine controller 801 according to the content (control specification) of the control command and starts the engine 70.

Besides, in Step S530, in a case where the control command is received from the center server 100 by the DCM 90, the remote operation assistance controller 802 of the vehicle 2 sends the air conditioning start request including the control specification included in the control command from the center server 100 to the air conditioning controller 601 and starts the air conditioner 10. With this, the air conditioning controller 601 performs the operation control of the air conditioner 10 according to the control specification included in the air conditioning start request. For example, the air conditioning controller 601 performs the operation control of the air conditioner 10 based on the set temperature included in the air conditioning start request such that the inside temperature of the vehicle 2 becomes the set temperature.

In a case where a content for delaying the start timing is included in the control specification, the remote operation assistance controller 802 sends the engine start request and the air conditioning start request to the engine controller 801 and the air conditioning controller 601 at a timing specified by the control specification.

In a case where the start of the engine 70 and the air conditioner 10 is completed, in Step S532, the remote operation assistance controller 802 transmits start notification of completion of the start of the engine 70 and the air conditioner 10 to the center server 100 through the DCM 90.

In a case where the start notification from the vehicle 2 is received by the communication processing unit 1201, in Step S534, the relay controller 1202 of the center server 100 transfers the start notification to the portable terminal 200 through the communication processing unit 1201. With this, for example, the display controller 2202 of the portable terminal 200 can display on the display 240 that the start of the engine 70 and the air conditioner 10 is normally completed when the communication processing unit 2201 receives the start notification, and can notify the user that the start of the engine 70 and the air conditioner 10 is completed.

In Step S536, the communication processing unit 2201 of the portable terminal 200 transmits the positional information of the portable terminal 200 to the center server 100 at a regular timing specified in advance or specified by the user positional information request (positional information update notification).

In a case where the positional information update notification is received by the communication processing unit 1201, in Step S538, the optimization controller 1203 of the center server 100 determines whether the control specification of the air conditioner 10 needs to be changed. Specifically, the optimization controller 1203 of the center server 100 determines whether there is a user's abnormal behavior (for example, a user's behavior of stopping or moving away from the vehicle) based on latest positional information of the portable terminal 200 included in the positional information update notification received by the communication processing unit 1201 and previous positional information of the portable terminal 200 as described above.

In a case where determination is made that the control specification needs to be changed, in Step S540, the optimization controller 1203 of the center server 100 determines a new control specification and transmits a control change command including the new control specification to the vehicle 2 through the communication processing unit 1201.

In a case where the control change command is received by the DCM 90, in Step S542, the remote operation assistance controller 802 of the vehicle 2 sends a control change request including the new control specification included in the control change command to the air conditioning controller 601. With this, the air conditioning controller 601 changes the control specification (for example, the set operation time and the like) of the air conditioner 10 and performs operation control of the air conditioner 10 with the control specification.

After the communication processing unit 1201 of the center server 100 transmits the control change command to the vehicle 2 (Step S540), in Step S544, the optimization controller 1203 of the center server 100 transmits control content change notification indicating that the control specification including the new control specification is changed to the portable terminal 200 through the communication processing unit 1201.

In a case where the control content change notification is received from the center server 100 by the communication processing unit 2201, in Step S546, the control content notification unit 2204 of the portable terminal 200 displays the display 240 display the control specification included in the control content change notification on the display 240 through the display controller 2202. With this, it is possible to allow the user to confirm that the control specification of the air conditioner 10 is changed.

Even in a case of changing the control specification, similarly to a case of setting an initial control specification (Steps S518 to S526), a form may be made in which the control specification of the air conditioner 10 is actually changed in a case where the user gives permission. On the contrary, in a case of setting the initial control specification, similarly to a case of changing the control specification (Steps S538 to S546), a form may be made in which the control specification determined based on the positional information of the vehicle 2 and the positional information of the portable terminal 200 by the optimization controller 1203 of the center server 100 is notified to the portable terminal 200 later.

For example, in a case where the set operation time has elapsed after the start of the engine 70 and the air conditioner 10, in Step S548, the remote operation assistance controller 802 of the vehicle 2 transmits an air conditioning stop request to the air conditioning controller 601. With this, the air conditioning controller 601 stops the air conditioner 10 in operation.

Besides, in a case where the set operation time has elapsed after the start of the engine 70 and the air conditioner 10, in Step S550, the remote operation assistance controller 802 of the vehicle 2 sends an engine stop request to the engine controller 801. With this, the engine controller 801 stops the engine 70.

In a case where the stop of the air conditioner 10 and the engine 70 is completed, in Step S552, the remote operation assistance controller 802 of the vehicle 2 transmits stop notification of completion of the stop of the air conditioner 10 and the engine 70 to the center server 100 through the DCM 90.

In a case where the stop notification from the vehicle 2 is received by the communication processing unit 1201, in Step S554, the relay controller 1202 of the center server 100 transfers the stop notification to the portable terminal 200 through the communication processing unit 1201. With this, for example, the display controller 2202 of the portable terminal 200 displays on the display 240 that the stop of the air conditioner 10 and the engine 70 is normally completed when the communication processing unit 2201 receives the stop notification, or the like, thereby notifying the user that the stop of the air conditioner 10 and the engine 70 is normally completed.

In this way, in the embodiment, the air conditioner 10 of the vehicle 2 is started with the start request transmitted to the center server 100 through the communication processing unit 2201 according to (a request from the remote operation unit 2203 based on) a predetermined operation of the user. Then, the optimization controller 1203 performs the control of the air conditioner 10 including the start timing based on the positional information of the portable terminal 200 and the positional information of the vehicle 2 (specifically, determines the control specification and transmits the control command including the control specification to the vehicle 2 through the communication processing unit 1201). Accordingly, since it is possible to ascertain the position of the user from the positional information of the portable terminal 200, it is possible to operate the air conditioner 10 in consideration of the position of the user.

In the embodiment, the control content notification unit 2204 of the portable terminal 200 notifies the user of the control specification, and on an assumption that the user performs the permission operation, the control of the air conditioner 10 is performed based on the positional information of the portable terminal 200 and the positional information of the vehicle 2; however, a form may be made in which notification to the user or the permission operation of the user is omitted.

In the embodiment, the optimization controller 1203 of the center server 100 starts the air conditioner 10 based on the start request transmitted from the portable terminal 200 to the center server 100, in a case where the set operation time has elapsed after the start, stops the air conditioner 10, and makes the set operation time longer or the start timing of the air conditioner 10 later when the distance between the vehicle 2 and the portable terminal 200 based on the positional information of the vehicle 2 and the positional information of the portable terminal 200 becomes longer. Accordingly, for example, it is possible to suppress a situation in which the air conditioner 10 is stopped long before the user arrives at the vehicle, and the inside of a cabin of the vehicle is returned to a cooled state (winter) or a warmed state (summer) before the user arrives at the vehicle.

In the embodiment, after the start request is transmitted from the portable terminal 200, in a case where the user's behavior of stopping or moving away from the vehicle is confirmed based on the positional information of the portable terminal 200, the optimization controller 1203 of the center server 100 makes the set operation time longer or the start timing of the air conditioner 10 later. With this, even though the timing at which the user arrives at the vehicle is made late due to the user's behavior or stopping or moving away from the vehicle, it is possible to suppress a situation in which the inside of a cabin of the vehicle is returned to a cooled state (winter) or a warmed state (summer) before the user arrives at the vehicle.

In the embodiment, in a case where the distance between the vehicle 2 and the portable terminal 200 based on the positional information of the portable terminal 200 and the positional information of the vehicle 2 exceeds a predetermined threshold, the optimization controller 1203 of the center server 100 restricts the start of the air conditioner 10. With this, for example, in a situation in which the distance between the vehicle 2 and the user is too large and the operation time of the air conditioner 10 becomes extremely too long, the start of the air conditioner 10 is restricted. For this reason, it is possible to suppress a situation in which the operation time of the air conditioner 10 becomes extremely long and energy is wastefully consumed.

In the embodiment, the optimization controller 1203 of the center server 100 controls the air conditioner 10 based on the learning data relating to the past behavior pattern of the user ascertained based on the positional information of the portable terminal 200 until the user arrives at the vehicle 2 from the input of a predetermined operation. With this, since the past behavior pattern of the user can be taken into consideration in addition to the positional information of the user, for example, it is possible to realize air conditioning control adjusted to the user, such as taking a time until the user arrives at the vehicle into consideration and controlling the air conditioner 10 such that the set temperature is reached at the arrival time.

In the embodiment, in a case where the air conditioner 10 is controlled based on the positional information of the portable terminal 200 and the positional information of the vehicle 2 (specifically, in a case where the air conditioner 10 is controlled with the control specification determined based on the positional information of the portable terminal 200 and the positional information of the vehicle), the control content notification unit 2204 of the portable terminal 200 notifies the user that the air conditioner 10 is controlled. With this, in a case where the air conditioner 10 is controlled in consideration of the positional information of the user, the user is notified that the air conditioner 10 is controlled. For this reason, for example, in a case where the control specification is changed from the content (for example, the set operation time of the air conditioner 10, or the like) set by the user, it is possible to suppress a situation in which the user feels a sense of discomfort.

In the embodiment, the control content notification unit 2204 of the portable terminal 200 gives notification of the recommendation information relating to the control specification of the air conditioner 10 settable from the portable terminal 200 or the restriction information for recommending the start restriction of the air conditioner 10 based on the positional information of the portable terminal 200 and the positional information of the vehicle 2. With this, the user is notified of the recommendation information relating to the control specification of the air conditioner 10 or the restriction information for recommending the start restriction based on the positional information of the portable terminal 200, whereby it is possible to allow the user to perform an operation (permission operation or selection operation) corresponding to the recommendation information or the restriction information on the portable terminal 200 and to change various settings of the air conditioner 10 or cancel the start of the air conditioner 10. For this reason, it is possible to operate the air conditioner 10 in consideration of the position of the user.

In the embodiment, the control content notification unit 2204 gives notification of the recommendation information for making the set operation time longer or the start timing later when the distance between the vehicle 2 and the portable terminal 200 based on the positional information of the portable terminal 200 and the positional information of the vehicle 2 becomes longer. With this, the user performs an operation (permission operation or selection operation) corresponding to the recommendation information on the portable terminal 200, whereby, for example, it is possible to suppress a situation in which the air conditioner is stopped long before the user arrives at the vehicle, and the inside of a cabin of the vehicle is returned to a cooled state (winter) or a warmed state (summer) before the user arrives at the vehicle.

In the embodiment, in a case where the distance between the vehicle 2 and the portable terminal 200 based on the positional information of the portable terminal 200 and the positional information of the vehicle 2 exceeds the predetermined threshold, the control content notification unit 2204 of the portable terminal 200 may give notification of the restriction information for recommending the start restriction of the air conditioner 10. With this, for example, in a situation in which the distance between the user and the vehicle 2 is too large and the operation time of the air conditioner 10 becomes extremely too long, the restriction information is notified. For this reason, the user performs an operation (permission operation or selection operation) corresponding to the restriction information on the portable terminal 200 and cancels the start of the air conditioner 10, or the like, whereby it is possible to suppress a situation in which the operation time of the air conditioner 10 becomes extremely long and energy is wastefully consumed.

In the embodiment, although the set operation time is set and the operation time of the air conditioner 10 started according to the start request transmitted from the portable terminal 200 to the vehicle 2 through the center server 100 is restricted, a form may be made in which the set operation time is not set (that is, a form may be made in which the operation of the air conditioner 10 is continued until the user arrives at the vehicle 2).

In the embodiment, a functional unit that substantially performs the control of the air conditioner 10, that is, a functional unit (another example of a controller) that determines the control specification of the air conditioner 10 based on the positional information of the vehicle 2 and the positional information of the portable terminal 200 may be provided in the portable terminal 200 or the vehicle 2 (for example, the air conditioner ECU 60, the engine ECU 80, or the like), instead of the center server 100 (optimization controller 1203). For example, in a case where the functional unit is provided in the portable terminal 200, the positional information of the vehicle 2 is transmitted from the vehicle 2 to the portable terminal 200 through the center server 100, and information relating to the determined control specification of the air conditioner 10 is transmitted from the portable terminal 200 to the vehicle 2 through the center server 100. For example, in a case where the functional unit is provided in the vehicle 2, the positional information of the portable terminal 200 is transmitted from the portable terminal 200 to the vehicle 2 through the center server 100, and information relating to the determined control specification of the air conditioner 10 is transmitted from the vehicle 2 to the portable terminal 200 through the center server 100.

Although the mode for carrying out the disclosure has been described above in detail, the disclosure is not limited to such specific embodiments, and various modification and alterations may be made without departing from the scope of the disclosure.

For example, in the embodiment, although the vehicle 2 includes the engine 70 as a power source, the vehicle 2 may include an electric motor as another power source instead of or in addition to the engine 70.

In the embodiment, although the air conditioner 10 (specifically, the compressor of the air conditioner 10) is operated with at least the engine 70 as a power source, (the compressor of) the air conditioner 10 may be operated solely with electric power supplied from a battery or a fuel cell (for example, a high voltage battery or a fuel cell that supplies electric power to an electric motor as another power source mounted in the vehicle 2) mounted in the vehicle 2, without needing the power of the engine 70. As described above, the remote operation assistance controller 802 solely starts the air conditioner 10 according to the start request transmitted from the portable terminal 200 through the center server 100. However, in a case where a state of charge (SOC) of the battery or a remaining fuel amount of the fuel cell is equal to or less than a predetermined threshold (for example, a value set in advance as the minimum state of charge or the minimum remaining fuel amount needed for driving the electric motor as the power source of the vehicle 2), even though the DCM 90 receives the start request from the portable terminal 200 through the center server 100, the remote operation assistance controller 802 may prohibit the start of the air conditioner 10.

What is claimed is:

1. A remote air conditioning start system including a portable terminal of a user, a center server that is configured to communicate with the portable terminal, and a vehicle that includes an air conditioner and is configured to communicate with the center server, the remote air conditioning start system comprising:

a user positional information acquisition unit configured to acquire positional information of the portable terminal;

a vehicle positional information acquisition unit configured to acquire positional information of the vehicle; and a controller configured to perform control of the air conditioner including a start timing of the air conditioner based on a start request transmitted from the portable terminal to the center server according to a predetermined operation of the user based on the positional information of the portable terminal and the positional information of the vehicle;

wherein the controller is configured to control the air conditioner according to learning data relating to a past behavior pattern of the user ascertained based on the positional information of the portable terminal acquired in a period beginning with an input of the predetermined operation and ending when the user arrives at the vehicle.

2. The remote air conditioning start system according to claim 1, wherein:

the controller is configured to start the air conditioner based on the start request;

the controller is configured to determine a set operation time based on the learning data; and the controller is configured to stop the air conditioner when the set operation time has elapsed after the start.

3. The remote air conditioning start system according to claim 2, wherein the controller is configured to, when a user's behavior of stopping or a behavior of moving away from the vehicle is confirmed based on the positional information of the portable terminal after the start request is transmitted from the portable terminal, make the set time longer or the start timing of the air conditioner later.

4. The remote air conditioning start system according to claim 1, wherein the controller is configured to, when a distance between the vehicle and the portable terminal based on the positional information of the portable terminal and the positional information of the vehicle exceeds a predetermined threshold, restrict the start of the air conditioner.

5. The remote air conditioning start system according to claim 4, wherein the controller is configured to, when the distance between the vehicle and the portable terminal exceeds the predetermined threshold, prohibit the start of the air conditioner.

6. The remote air conditioning start system according to claim 4, wherein the controller is configured to, when the distance between the vehicle and the portable terminal exceeds the predetermined threshold, start the air conditioner aft-ef while restricting an air volume.

7. The remote air conditioning start system according to claim 1, further comprising a notification unit provided in the portable terminal, wherein the notification unit is configured to, when the controller controls the air conditioner based on the positional information of the portable terminal and the positional information of the vehicle, notify the user that the air conditioner is controlled.

8. A remote air conditioning start system including a portable terminal of a user, a center server that is configured to communicate with the portable terminal, and a vehicle that includes an air conditioner and is configured to communicate with the center server, the remote air conditioning start system comprising:

a user GPS receiver to acquire positional information of the portable terminal;

a vehicle GPS receiver to acquire positional information of the vehicle; and processing circuitry programmed to perform control of the air conditioner including a start timing of the air conditioner based on a start request transmitted from the portable terminal to the center server according to a predetermined operation of the user based on the positional information of the portable terminal and the positional information of the vehicle;

wherein the processing circuitry is programmed to control the air conditioner according to learning data relating to a past behavior pattern of the user ascertained based on the positional information of the portable terminal acquired in a period beginning with an input of the predetermined operation and ending when the user arrives at the vehicle.

* * * * *